May 13, 1941.  S. W. SHELLEY  2,242,149
PLANT CONTAINER AND SEEDBED FORMED THEREFROM
Filed Dec. 5, 1939  2 Sheets-Sheet 1
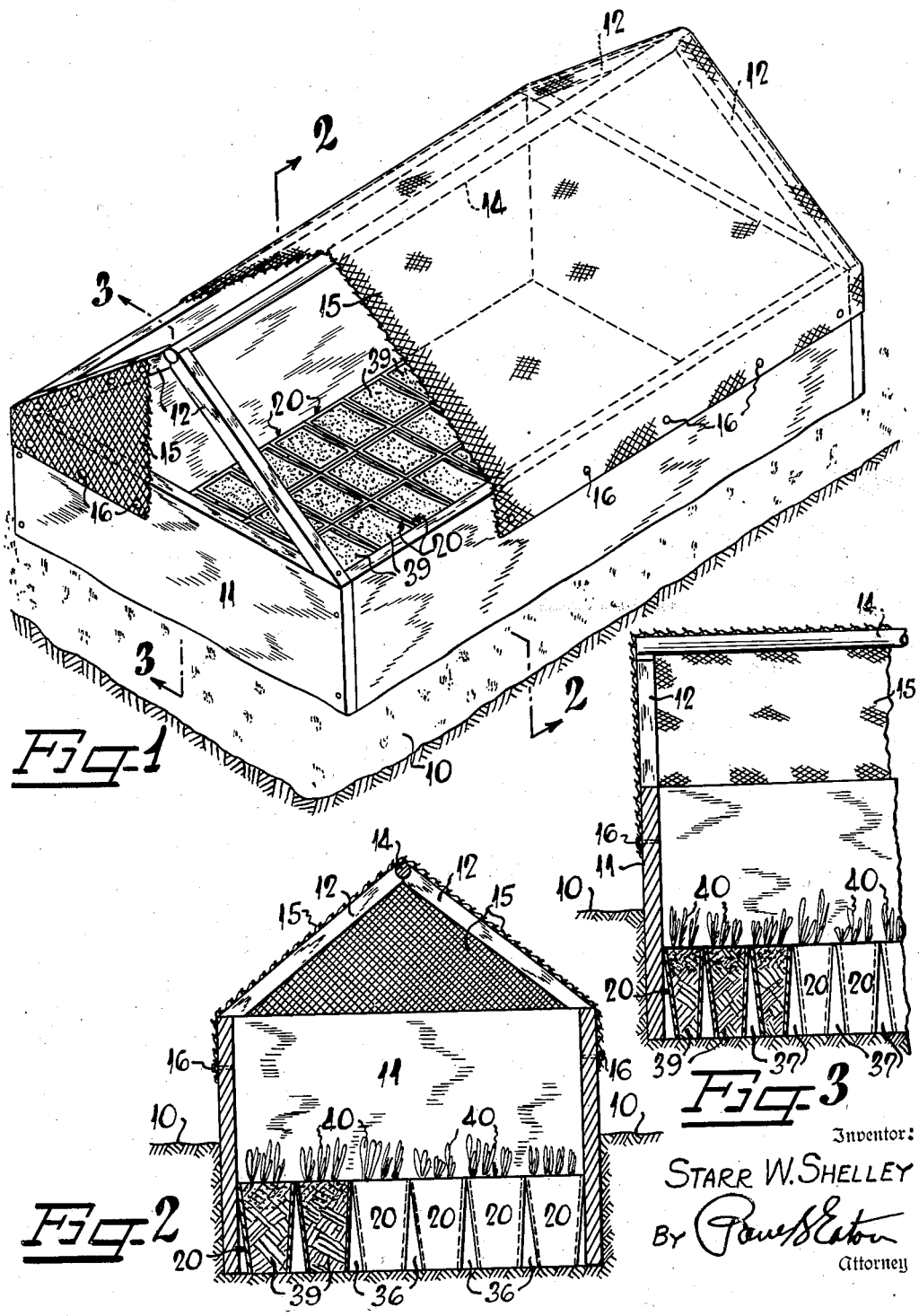
Inventor:
STARR W. SHELLEY
By （signature）
Attorney

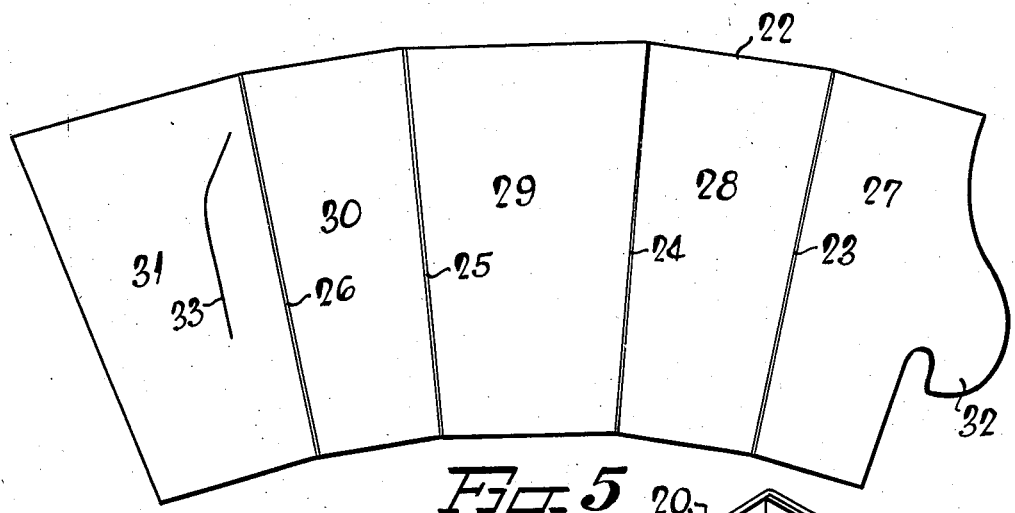
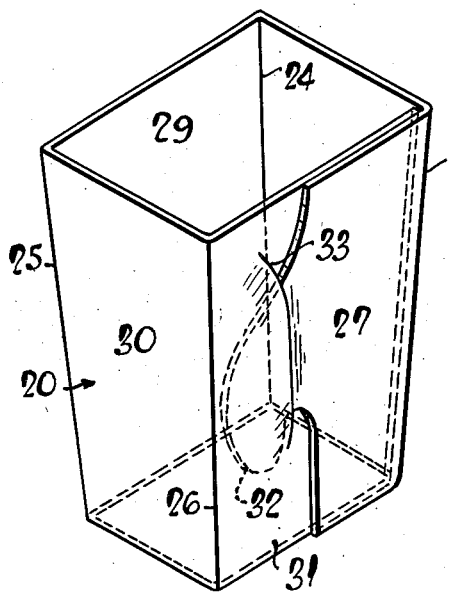
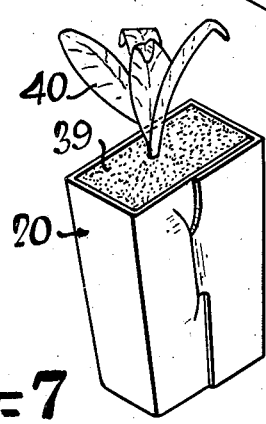

Patented May 13, 1941

2,242,149

UNITED STATES PATENT OFFICE 2,242,149

PLANT CONTAINER AND SEEDBED FORMED THEREFROM

Starr W. Shelley, Charlotte, N. C.

Application December 5, 1939, Serial No. 307,646

1 Claim. (Cl. 47—19)

This invention relates to plant containers and a seedbed formed from the same. Broadly speaking the invention relates to an improved means whereby small seeds from plant life, such as tobacco, cabbage and the like may be germinated and subsequently transplanted without disturbing the root structure.

Much difficulty is encountered in transplanting, due to the fact that the plants are pulled up, root and all, from the seedbed and then placed in suitable hills where they grow to mature plants. When the plant is pulled from the seedbed, the roots are very often broken and other portions of the plant damaged, resulting in a setback of several weeks in the growth of the plant, especially if the transplanting season happens to be dry. Therefore, it is seen that if means can be provided whereby a substantial portion of the earth surrounding the plant roots can be carried with the plant during transplanting, the likelihood of the plant surviving and beginning an early growth is considerably enhanced. Heretofore, attempts have been made to germinate plants in individual containers, after which the plant together with the surrounding earth were transplanted. These attempts have not been practical due to the improper ventilation provided for the exterior of the sidewalls of the containers in which the earth was placed. Due to the shape of the containers themselves, there was a tendency for the moisture to deteriorate the sidewalls, thereby preventing the removal of the plant together with the container, when transplanting.

It is preferable to make containers of this nature from a suitable material such as cardboard. If the proper ventilation is provided for the exterior of the sidewalls, they will remain sufficiently strong during the germination period and the early growth of the plant, to retain their shape. Upon transplanting, however, the moist earth contacts the sidewalls of the container, and immediately causes the same to deteriorate, thus allowing the roots to penetrate to the surrounding earth.

It is an object of this invention to provide a bottomless cardboard container resembling an inverted frustrated pyramid in which earth can be placed and seeds can be planted for germination.

It is a further object of this invention to provide a seedbed formed from a plurality of the above-named frustrated pyramidical cardboard containers, which containers are placed flush-top adjacent each other so that substantially all of the entire top surface will be available as a planting area and so that ventilating spaces between the container sidewalls will be provided beneath the planting surfaces. A seedbed of this type is particularly advantageous in tobacco sections. Recently great difficulty has been encountered by the planters on account of blue mould, which disease attacks the tobacco plant while in the seedbed and causes the plant to wilt and die. The germ causing this mould resides in the earth and in order to prevent the plant from becoming infected, it is necessary to sterilize the earth before planting the seed therein. When using a seedbed of this type, it is necessary to subject the earth to a desired sterilization temperature and then place the same within these containers, so as to insure that the germ producing this blue mould upon the tobacco will be killed.

Some of the objects of the invention having been stated, other objects will appear as the description proceeds, when taken in connection with the accompanying drawings, in which—

Figure 1 is an isometric view of my improved seedbed;

Figure 2 is a transverse vertical sectional view taken along the line 2—2 in Figure 1;

Figure 3 is a longitudinal sectional view taken through one end of the seedbed shown in Figure 1, and along the line 3—3;

Figure 4 is an isometric view of a plurality of empty containers which are placed flush-top and in the side by side relation that they occupy when in the seedbed, so as to provide the necessary ventilating space between the adjacent sidewalls;

Figure 5 is a view of a blank from which each of these containers is formed;

Figure 6 is an isometric view of an empty container showing the means for joining the ends of the blank together;

Figure 7 is an isometric view similar to Figure 6, but showing earth placed therein and also a plant as it appears when ready for transplanting.

One of the preferred methods of forming a seedbed embodying the present invention is to dig a hole within the ground 10 in such a manner that the bottom portion thereof will be substantially level. Then a suitable rectangular frame 11, which in the present instance comprises a plurality of boards nailed together, is placed within this hole to support the sidewalls and prevent caving, said frame extending a substantial distance above the earth surface. In order to provide a support for covering the frame 11, suitable rafters 12 and a ridge pole 14 are secured on top of the frame. A canvas cloth 15 is then adapted to be mounted upon this supporting structure which cloth has its edges normally secured to the rectangular frame 11, by any suitable means such as tacks or nails 16. The purpose of the canvas cover is to retain the moisture and heat within the enclosed seed bed during the germination of the seeds and early growth of the plant.

Before the cover 15 is placed over the members 11, 12 and 14, suitable individual polygonal earth containers 20 are placed therein, side by side, in a flush-top manner so that the entire upper surface may be utilized for planting purposes when the containers are filled. Figures 5, 6 and 7 show the details of a container of this type. It is here noted that the containers 20 are formed from a suitable blank 22 having creased lines 23, 24, 25 and 26 thereby forming sections or areas 27, 28, 29, 30 and 31. The section 27 has integral therewith a hook-shaped tab 32, and the area 31 on the other end of the blank has a slit 33 therein. When it is desired to form the container 20, the blank 22 is folded along lines 23, 24, 25 and 26 in the manner shown in Figure 6 and then the tab 32 is hooked into the slit 33 to secure the two ends together. This will provide a frusto-pyramidal shell having an open top and an open bottom. When these containers are placed in side by side relationship in the manner shown in Figures 1, 2, 3 and 4, suitable longitudinal V-shaped channels 36 and 37, respectively, are provided, which insure the proper ventilation of the exterior of the containers.

It will be seen by observing Figures 1, 2, 3, and 4 that the containers 20 when assembled, do not touch each other, except at their uppermost ends, yet due to the polygonal shape of the upper ends, the containers can be arranged in abutting relation so that all of the upper surface is available for planting purposes.

After the containers have been placed within the framework 11 and upon the bottom of the hole within the ground 10, sterilized earth 39 is placed within each container. When these containers are filled, the seed are indiscriminately scattered over the entire surface and after germination the plants 40 result. At a time prior to the transplanting process, all of the plants in each container are removed with the exception of one as shown in Figure 7, and then the entire container, together with the plant and the earth therein is transferred to an especially prepared hill where the plant continues to grow to maturity.

Due to the longitudinal and transverse ventilating channels 36 and 37, the moisture within the containers while in the frame 11 is not sufficient to cause the sidewalls to break down, but upon transplanting these containers, the moisture from the contacting earth, as well as the moisture within the container will so saturate the sidewalls of this cardboard box that the box will deteriorate within a very short time. This will allow the roots of the plant to penetrate the sidewalls of the container during the growth.

Also by providing a bottomless container, the earth 39 within the container, while it is in the framework 11, will have contact with the earth 10, upon which it rests. It is quite evident that due to the tapered shape of each of the containers the dirt 39 therein, after a few weeks settling, will consolidate sufficiently to hold its shape and remain within the container while being transplanted despite the fact that there is no bottom therein.

It is therefore seen that I have provided a tapered cardboard container which is adapted to be placed in abutting relationship with similar cardboard containers in such a manner that the upper surfaces of all the containers will present a united area. All of this united area can be used for a planting surface. The tapered sidewalls are provided so that each container will be out of contact with the adjacent containers, thereby preventing the container walls from absorbing an excessive amount of moisture and prematurely breaking down before the plant is transplanted.

In the drawings and specification, there has been set forth a preferred embodiment of the invention, and although specific terms are employed, they are used in a generic and descriptive sense only and not for purposes of limitation, the scope of the invention being set forth in the appended claim.

I claim:

A seedbed for growing plants for transplanting, comprising a rectangular box and a plurality of pasteboard seed boxes having open upper and lower ends and being rectangular in horizontal cross-section throughout their height, and having opposed pairs of walls converging as they progress downwardly, the sizes and numbers of seed boxes being sufficient to cause their upper edges to present a planular unbroken upper surface so that soil may be dumped onto all the seed boxes without any of the soil entering the spaces between the lower portions of the seed boxes, and when a seed is planted in each seed box and water is applied thereto, the circulation of air between all of the sidewall surfaces of the seed boxes will prevent decomposition of the seed boxes while the plants therein are growing.

STARR W. SHELLEY.